United States Patent [19]

Rufray et al.

[11] Patent Number: 4,661,844

[45] Date of Patent: Apr. 28, 1987

[54] INTEGRATED CIRCUIT FOR THE COLOR DECODER OF A TELEVISION SET

[75] Inventors: Jean-Claude Rufray, VS-Überauchen; Antoine Pery, Villingen-Schwenningen, both of Fed. Rep. of Germany

[73] Assignee: Deutsche Thomson-Brandt GmbH, VS-Villingen, Fed. Rep. of Germany

[21] Appl. No.: 674,227

[22] Filed: Nov. 23, 1984

[30] Foreign Application Priority Data

Nov. 23, 1983 [DE] Fed. Rep. of Germany ....... 3342181

[51] Int. Cl.[4] .......................... H04N 9/64; H04N 3/27
[52] U.S. Cl. .......................................... 358/23; 358/24
[58] Field of Search ................... 358/24, 23, 11, 21 R, 358/14, 15, 16, 40, 18, 140, 158

[56] References Cited

U.S. PATENT DOCUMENTS 4,414,563 11/1983 Juhnke et al. .................... 358/21 R
4,419,688 12/1983 Miskin et al. ..................... 358/21 R

FOREIGN PATENT DOCUMENTS 0052269 3/1982 Japan .................................... 358/24

OTHER PUBLICATIONS

"TDA 3560-Ein-Chip-Pal-Decoder", *Radio Mentor Electronics* (Germany), vol. 46, No. ½ (1980).
Shimano et al., "One-Chip Chroma IC for Color TV Receiver", *IEEE Transactions on Consumer Electronics*, vol. CE-21, No. 2, pp. 164-170, May 1975.
Harwood et al., "Integrated NTSC Chrominance/Luminance Processor", *IEEE Transactions on Consumer Electronics*, vol. CE-26, No. 4, pp. 693-706, Nov., 1980.
Harwood, "An Integrated One-Chip Processor for Color TV Receivers", *IEEE Transactions on Consumer Electronics*, vol. CE-23, No. 3, pp. 300-310, Aug., 1977.

*Primary Examiner*—John W. Shepperd
*Attorney, Agent, or Firm*—Horst M. Kasper

[57] ABSTRACT

An integrated circuit is provided for the color decoder of a television receiver set and in particular for a multi-standard decoder for NTSC, PAL and SECAM. Conventionally employed external components used for synchronizing and amplitude calibration are replaced by circuits forming part of an integrated circuit, which automatically adjust for the desired operational mode such as NTSC, PAL or SECAM in each case. This system saves previously required external components such as trimming resistors, potentiometers or quartz crystals. A digital automatic frequency control circuit can provide the synchronization of oscillators within the integrated circuit which oscillators generate the required reference carriers required for the decoding of the chrominance carrier. In addition, the switches for the processing of signals of various color television standards can be incorporated within the integrated circuit.

37 Claims, 3 Drawing Figures

INTEGRATED CIRCUIT FOR THE COLOR DECODER OF A TELEVISION SET

DESCRIPTION

BACKGROUND OF THE INVENTION

1. Field of the Invention

The invention relates to an integrated circuit for the color decoder of a television receiver, in particular, for a multi-standard color decoder for processing of color television signals according to the NTSC-, PAL-, and the SECAM color television system.

2. Brief Description of the Background of the Invention Including Prior Art

It is known to join the components necessary for the decoding of the chrominance carrier and for the generation of the color difference signals into an integrated circuit, the so-called chroma-IC, which in particular comprises the color difference amplifier, synchronous demodulators, reference carrier oscillators, matrix circuits, amplifiers for the color difference signals, the line frequency PAL (phase alternation line)— and/or SECAM (sequentielle a memoire) and phase-locked loop (PLL)—circuits. Such an integrated circuit is fed with the modulated chrominance carrier and the Sandcastle pulse and it provides at its outputs the two color difference signals (B-Y) and (R-Y). Such an integrated circuit of the type TDAC560 is described for example for a PAL-decoder in "Funktechnik" in the journal Funktechnik, 1979, No. 9, pp. t445 to t448. Such a circuit requires for problem-free operation and for the adjustment of optimum operation condition external components such as for example coils which can be balanced, adjustable with resistors as well as a quartz crystal as frequency standard for the reference carrier oscillator contained in the switching circuit, which reference carrier oscillator provides the reference carrier for the decoding of the chrominance carrier. Such external components are relatively expensive and have to be calibrated manually during the production of a color television receiver set.

SUMMARY OF THE INVENTION

1. Purposes of the Invention

It is an object of the present invention to provide an integrated circuit for a color television receiver set where external components are substituted for by internal circuits automatically adjusting the operation condition.

It is another object of the present invention to reduce the expenditure relating to external components and the expenditure for manual adjustment of the internal operation conditions of an integrated circuit for a color television set.

It is a further object of the present invention to provide internal digital automatic frequency control for furnishing synchronization functions.

These and other objects and advantages of the present invention will become evident from the description which follows.

2. Brief Description of the Invention

The present invention provides an integrated circuit for chrominance decoding in a television receiver comprising substituting external components for synchronization, balancing and/or calibration by internal automatic components automatically adjusting the desired operational condition in each case to an optimal value.

A calibration means for the amplitudes of the PAL delay line decoder is provided by phase comparison of the color synchronizing burst components at the outputs of the adding stage and of the subtraction stage for obtaining a regulating voltage for automatically controlling of the amplification of the delayed or undelayed chrominance carrier F.

A phase comparison stage can be provided for the amplitude calibration during SECAM operation where the SECAM color carriers of time sequential lines are applied to inputs of the phase comparison stage and an output voltage of the phase comparison stage is employed for regulating the amplification of the undelayed or delayed SECAM chrominance carrier during the duration of the unmodulated SECAM-chrominance carrier oscillations at the start of each line.

A PAL delay time decoder can be provided, where the phase calibration is achieved by evaluation of the phase of the color synchronizing burst component at an output of the adding stage or of the subtraction stage relative to a fixed modulation axis via obtaining a regulating voltage for automatically controlling the phase rotation of the phase shifter disposed in the path of the undelayed or of the delayed chrominance carrier. The phase shifter is preferably employed for the manual adjustment of the color tint during NTSC operation.

A connection terminal of the circuit can have an externally adjustable voltage. A control terminal can be associated with the phase shifter having applied the external voltage.

The change of the phase shift of the phase shifter can be effective for adjusting the color tint only during the duration of the color synchronizing burst and only during the horizontal line forward run time.

A terminal for the application of an external reference voltage can provide synchronizing functions via an internal digital automatic frequency control circuit. An internal oscillator can generate a reference carrier for the decoding of the chrominance carrier F and can be synchronized by the internal automatic frequency control circuit.

A PAL and/or NTSC reference carrier oscillator can be furnished by the circuit. A phase locked loop circuit such that the PAL and/or NTSC reference carrier oscillator can be synchronized by the color synchronization burst signal via the phase locked loop.

A test pulse generator can generate a test pulse of defined duration. The frequency determination can be provided by counting the number of periods of the voltage to be measured in each case in the digital automatic frequency control circuit.

A measurement of the frequencies of several oscillators can be performed cyclically and successively by switching an input of the digital automatic frequency control circuit with the switch between the outputs of the oscillators.

Separate registers can be fed cyclically and successively with the output of the digital automatic frequency control circuit for the individual control functions. An analog to digital converter can be fed with regulating voltages coming from the outputs of the registers for a generation of the synchronizing functions.

An output of the digital automatic frequency control circuit can be connected in parallel to the inputs of the registers and the registers can be activated according to a cyclical succession. A cyclical switching is preferably provided from field to field. A measurement or, respectively, activation is preferably performed during the vertical field blanking interval.

Switches can be furnished for the processing of signals of different color television standards (NTSC, PAL, SECAM) disposed within the integrated circuit. An externally connected equalization filter is provided for the chrominance carrier and effective during SECAM operation, which internal switch connects in parallel a damping resistor during NTSC and PAL operation. An external band pass filter for the chrominance carrier can be connected to the internal switch for switching on or off an external capacitor for the chrominance carrier frequency in each case. An internal switch can turn off the path of the delayed chrominance carrier to the adding stage and to the subtraction stage of the PAL matrix during NTSC mode operation.

Internal de-emphasis stages can be disposed in the path of the color difference signals ((R−Y), (B−Y)) and they can be switched on during SECAM operation. Two phase locked loop PLL-FM demodulators are preferably fed with two frequency modulated line sequentially transmitted chrominance carriers of differing frequency during SECAM mode operation.

A phase locked loop can include a PAL reference carrier oscillator and a phase comparison stage fed with a received modulated SECAM chrominance carrier during SECAM mode operation and the modulated SECAM chrominance carrier can be employed for the synchronizing of the SECAM switching with line frequency during the time of the color synchronizing burst signal based on the output voltage of phase locked loop occurring with a voltage polarity differing from line to line.

A control circuit can be furnished for automatically effecting a cyclical switching to the operational modes at the individual standards such as NTSC, PAL, SECAM and it can lock in this position upon recognition of an identification signal associated with such standard. A search finder circuit can effect the cyclical switching to the operational modes. An identification circuit can scan for the presence of a signal of the standard of the operational mode set in each case and which stops in the presence of such a signal.

Internal reactances can be disposed in the integrated circuit. An internal oscillator can be connected such that its frequency depends on the resonance frequency of the external oscillating circuit and where a set value is obtained by measuring of the oscillator frequency, which switches to the oscillating circuit internal reactances such that the oscillating circuit runs at the set point frequency. A band-pass filter can include an oscillating circuit and disposed in the path of the chrominance carrier.

A digital comparator can be fed with the voltage obtained by the frequency determination and with a frequency set point, which comparator operates alternatingly as a shift register and as a comparing counter. An adding stage can add the voltage obtained by a previous measurement and stored in the register to the difference voltage obtained in the comparator by comparing the actual value with the set point value. The sum signal is employed for frequency control.

There is also provided a method for decoding a chrominance signal in a television receiver set employing an integrated circuit which comprises automatically controlling synchronizing and calibration components of the television receiver set with control circuits of the integrated circuit for obtaining automatically the operational mode desired in each case.

The phase of the color synchronizing burst signal components can be compared for the amplitude calibration of the PAL delay time decoder. A control voltage for automatically adjusting the amplification of the delayed or undelayed chrominance carrier can be obtained at the outputs of an adding stage and of a subtracting stage of a PAL matrix.

The lines following in a time sequence can be applied to the inputs of a phase comparison stage for amplitude cablibration during SECAM operation. The amplification of the undelayed or of the delayed SECAM chrominance carrier can be automatically controlled during the duration of the unmodulated SECAM chrominance carrier oscillations at the start of each line. The phase of the color synchronizing burst signal component is preferably present at the output of an adding stage or of a subtraction stage of a PAL matrix relative to a fixed modulation axis. A voltage for automatic control of a phase shift of a phase shifter can be disposed in the path of an undelayed or of a delayed chrominance carrier.

An external reference frequency voltage can be applied at a terminal H. Synchronizing functions can be performed via an internal digital frequency control circuit.

A test pulse of defined duration can be generated from the reference frequency voltage. The number of periods of the voltage to be measured can be counted in each case during the duration of the test pulse. The integrated circuit can be switched internally for the processing of signals of different color television standards such as NTSC, PAL, SECAM.

The invention is based on the following consideration: the previously externally required components for the adjustment of certain parameters inside of an integrated circuit can be substituted for by an internal control circuit, which automatically regulates the parameter required in each case. This results in several advantages. Initially there are required less external, adjustable components for synchronization components. For example, a previously employed adjustable coil can be substituted for by a coil with a fixed inductor T or a potentiometer serving for amplitude calibration can be substituted for by a fixed resistor, which results in a saving of components. In addition, the previously required external quartz crystal tuned to the color carrier frequency for synchronizing the reference carrier oscillators can be eliminated. The elimination of the adjustable external components results in addition upon incorporation of the integrated circuit, that is, during the production of the color television receiver set, in a saving of labor expense, since the up until now required manual calibration and adjustment of several parameters is eliminated. A further advantage comprises that the operation conditions which have to be maintained in each case can also be maintained over a longer time duration of several years. If the operational mode in each case is adjusted for example with an external trimmer or trimming capacitor and deviations occur in the course of the years by aging of components, then generally a manual readjustment is required. In the case of the internally provided regulating circuit, this readjustment is not required since the automatic control circuit automatically adjusts the operation condition required in each case. The internally provided automatic control circuits represent generally a lower switching expenditure than the externally adjustable components. Additional expenditure of individual components or stages in an integrated circuit increases the cost of such a circuit only marginally. The advantage of the saving of the external components for the balancing and calibration is substantially larger than the disadvantage of the slight additional expenditure related to the integrated circuit.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawings, in which are shown several of the various possible embodiments of the present invention.

DESCRIPTION OF INVENTION AND PREFERRED EMBODIMENT

In accordance with the present invention there is provided an integrated circuit for the chrominance decoder and demodulator of a color television receiver set, where the internal functions are adjustable by synchronizing and balancing components in each case to optimum conditions, where these components are realized by internal automatic control circuits automatically adjusting to the opertational conditions of each case, which components are incorporated in the integrated circuit.

Preferably a control voltage for automatically controlling the amplification of the undelayed or delayed chrominance carrier F is obtained for the amplitude calibration of a PAL delay line decoder by phase comparison of the color synchronizing burst signal components at the outputs of the adding stage 7 and of the subtracting stage 8 of the PAL matrix.

In the case of amplitude calibration during SECAM operation, the SECAM color carrier is applied for time sequentially following lines at the inputs of a phase comparison stage 17. The output voltage occurring for the automatic control of the amplification of the undelayed or delayed SECAM chrominance carrier is employed during the duration of the unmodulated SECAM chrominance carrier oscillations at the start of each line.

A control voltage for automatically controlling the phase shifting of a phase shifter disposed in the path of the undelayed or the delayed chrominance carrier is obtained for the phase comparison of the PAL delayed time decoder by evaluating the phase of the color synchronizing burst signal component occurring at the output of the adding stage 7 or of the subtracting stage 8 of the PAL matrix relative to a fixed modulation at axis UV. Preferably the phase shifter is employed during NTSC (National Television System Committee) operation and for the manual adjustment of the color tint. An externally adjustable voltage can be applied to a control terminal of the phase shifter 6 at a connection terminal Z of the circuit 1. The adjustment of the phase shift of the phase shifter 6 can be effected for adjusting the color tint only during the duration of the color synchronizing burst signal or only during the horizontal line forward run time.

A terminal H can be provided for the application of an external reference frequency voltage, which is provided to supply synchronization functions via an internal digital automatic frequency control circuit 30. The digital automatic control circuit 30 can serve for the synchronization of internal oscillators VCO1, VCO2, VCO3 which generate the reference carriers required for the coding of the color carrier F. The PAL and NTSC reference carrier oscillator VCO3 can be synchronized both by the digital automatic frequency control circuit 30 as well as by the color synchronization burst signal via a phase-locked loop circuit 14 to 16. A test pulse 29 of the fine duration can be generated from the reference frequency voltage and the frequency determination in each case can be performed in the digital automatic frequency control circuit 30 by counting of the number of periods of the voltage to be measured in each case during the duration of the test pulse 29. The measurement of the frequencies of several oscillators VSO1, VSCOC2, VCO3, 34 can be performed cyclically and successively by switching an input of the digital automatic frequency control circuit 30 with a switch 31 cyclically and successively between the outputs of the oscillators. The output of the digital automatic frequency control circuit 30 for the individal synchronization functions can feed cyclically and successively separate registers 32, 41, 40, the outputs of which generate control voltages for the synchronization functions via a digital to analog converter 33, 43, 42.

The output of the digital automatic frequency control circuit 30 can be connected in parallel to the inputs of the registers 35, 32, 41, 40 and the registers can be activated cyclically and successively. The cyclical switching from field to field and the measurement or, respectively, activation can be performed during the vertical field blanking interval.

The switching for processing of signals of various color television standards such as NTSC, PAL, SECAM, can be disposed inside of the integrated circuit 1. An internal switch A1 can be provided which switches an externally connected equalization filter active during SECAM operation for the chrominance carrier and a damping resistor 20 active during NTSC and PAL operation can be connected in parallel. An internal switch N' can be provided which switches on or switches off an external capacitor 5 at an external band pass filter 4 for the chrominance carrier for trimming to the chrominance carrier frequency in each case. An internal switch 45 can be provided which switches off during NTSC operation the path of the delayed chrominance carrier to the adding stage 7 and to the subtracting stage 8 of the PAL matrix 7, 8. In the case of SECAM operation, the path of the color difference signal (R−Y), (B−Y) can be switched on by internal de-emphasis stages 12, 13. In the case of SECAM operation, the two frequency modulated, line sequentially transmitted chrominance carriers of different frequency can be applied to two PLL-FM demodulators. In the case of SECAM operation, the received modulated SECAM chrominance carrier of a phase-locked loop circuit can be fed in with the PAL reference carrier oscillator VCO3 and via a phase comparison stage 26.

The output voltage of the phase comparison stage 26 occurring during the time of the color synchronizing signal can be employed for synchronizing of the line frequency SECAM switching with polarity differing from line to line.

A control circuit 19, 44, can be provided which effects automatically a cyclical switching to the operation modes at the individual standard NTSC, PAL, SECAM and upon recognition of an identification signal coordinated to one standard it remains in this position. A search circuit 44 can be provided which effects the cyclical switching to the operational modes and simultaneously an identification circuit 19 can sequentially scan for the presence of a signal of the mode of operation set in each case and upon the presence of such a signal the identification circuit 19 can stop.

An internal oscillator 34 can be provided and can be connected such that its frequency depends on the resonance frequency of an external resonant oscillator circuit and such that the measurement of the oscillator frequency provides a set value, which switches an internal reactance such to the resonant oscillator circuit that the resonant oscillator assumes the set point resonant frequency.

Figure 2:
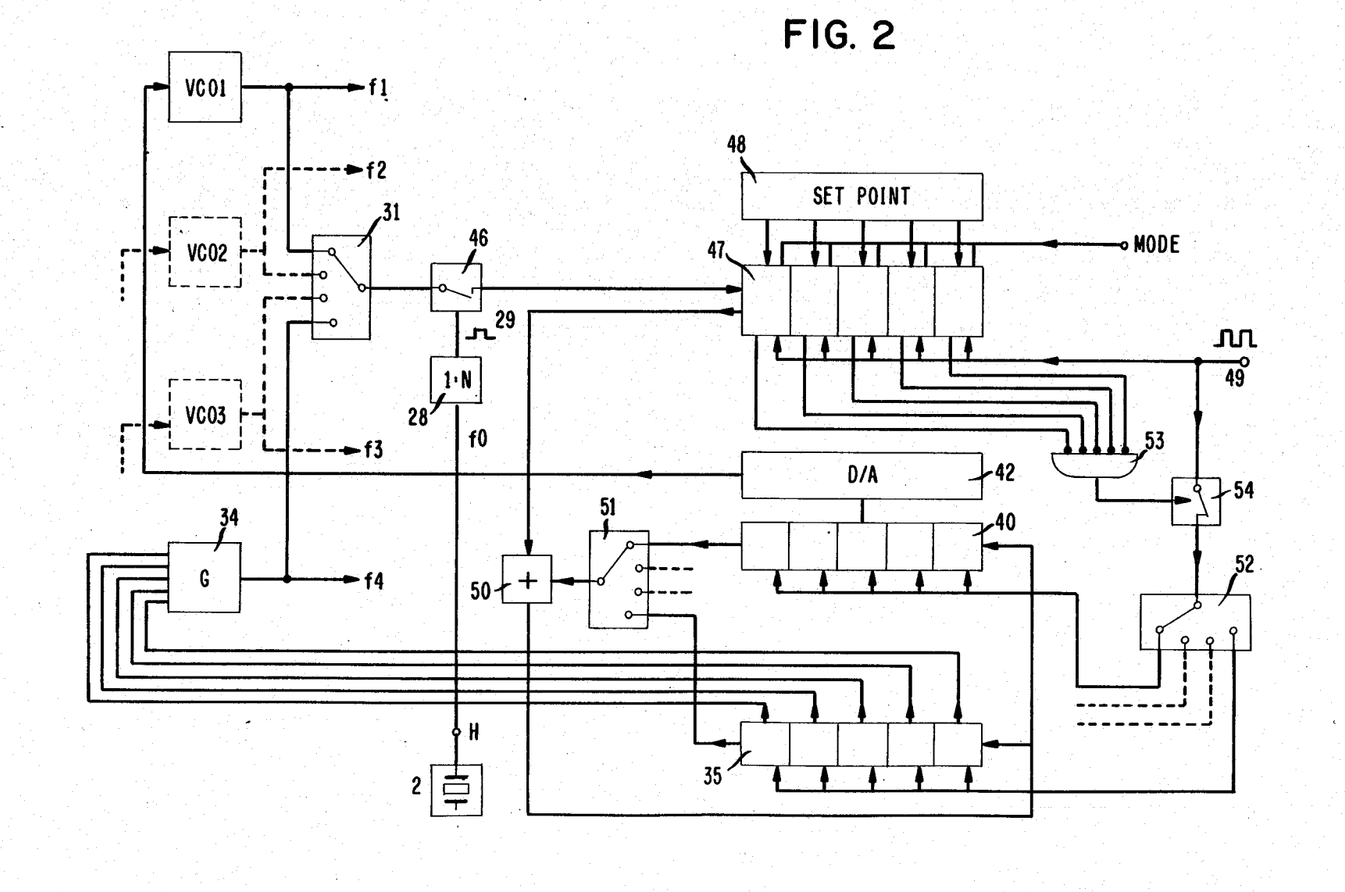
FIG. 2 is a detailed view of the digital automatic frequency control circuit represented in FIG. 1

The resonant oscillator circuit can comprise components of a band pass filter 4 disposed in the path of the chrominance carrier F. The voltage obtained by the frequency determination can be fed to a digital comparator 47 (FIG. 2) fed with the frequency set point, and the digital comparator can operate alternatingly as a shift register and as a comparing counter. A difference voltage obtained in the comparator 47 by a set point and actual value comparison is added in an adding stage 50 to the voltage obtained during a preceding measurement and stored in the register 40 and the sum signal is employed for the automatic frequency control as illustrated in FIG. 2.

Figure 1:
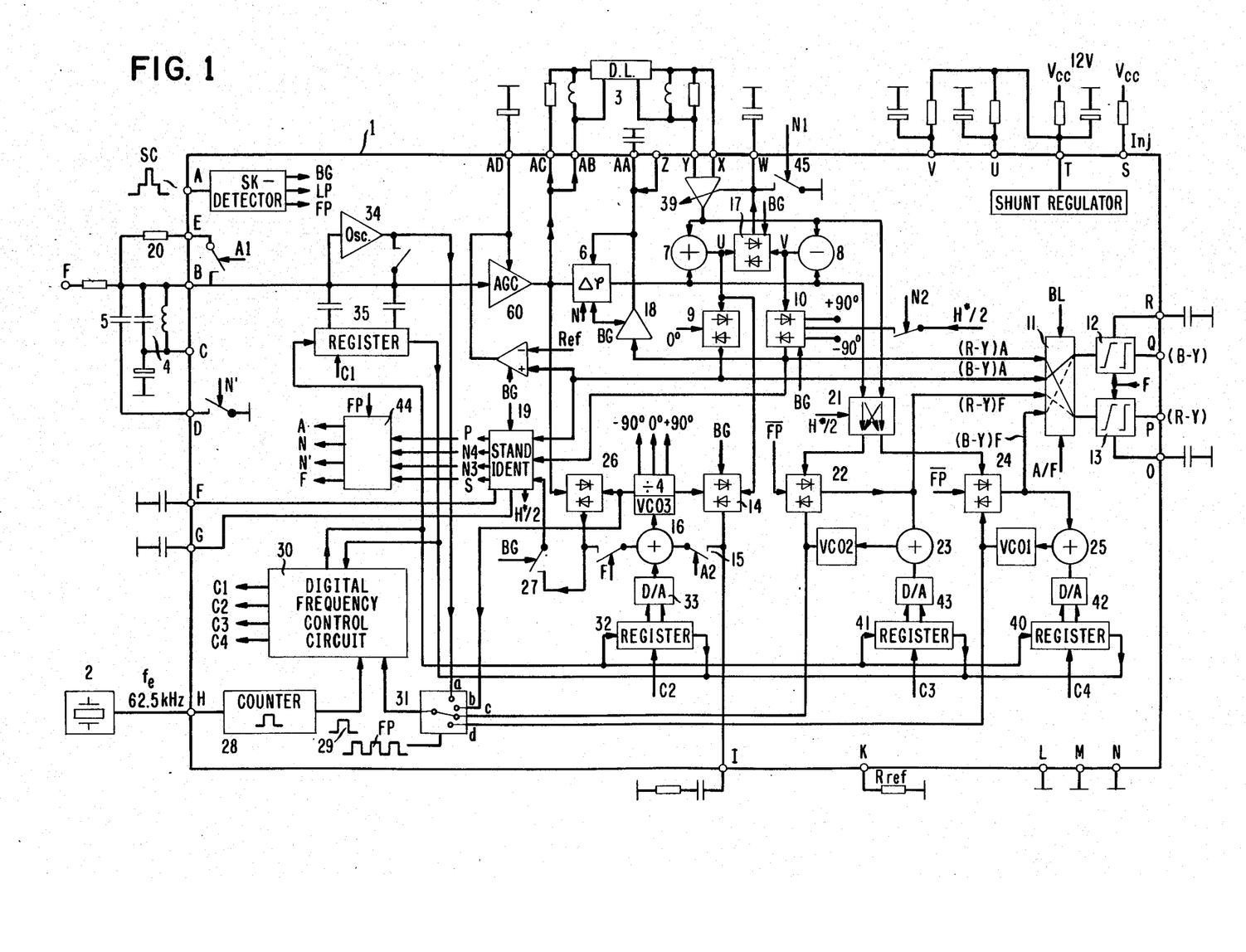
FIG. 1 is a schematic view of a block circuit diagram of the integrated circuit according to the present invention showing the still required components.

The integrated circuit illustrated in FIG. 1 is fed at the terminal A with the Sandcastle pulse SC and at the terminals B and C with the modulated chrominance carrier F. Capacitors for obtaining the required time constants of the internal identification circuit 19 are connected at the terminals F and G. A quartz oscillator 12 is connected at the terminal H, and the quartz oscillator provides a stabilizing frequency of 62.5 kilohertz. This quartz oscillator corresponds not to the generally required quartz with the chrominance carrier frequency of 4.43 megahertz for PAL or 3.58 Megahertz for NTSC. It is in fact a quartz present already at a another location of the color television receiver which for example is contained in a synthesizer or in an tuner, and its frequency does not have to coincide with the frequency of the color carrier. The input of the line delay line 3 required for PAL and SECAM operation is applied to the terminal AC and AB and the output of the line delay line 3 required for PAL and SECAM operation is connected to the terminals X and Y. The switching circuit 11 supplies the color difference signals (B−Y) and (R−Y) for the picture reproduction at the terminals Q,P.

The symbols employed in FIG. 1 have the following meaning.

P: output during identification of the PAL signal by recognition of the PAL color synchronizing burst signal switched within the phase of the line frequency, N3: output upon identification of an NTSC signal with the NTSC chrominance carrier frequency of 3.58 megahertz, N4: output upon identification of an NTSC signal with a chrominance frequency of 4.43 Megahertz, for example, at NTSC video recorders with PAL chrominance carrier frequency.

S: output upon identification of a SECAM signal by evaluation of typical SECAM chrominance carrier frequencies.

A: operation of the switching for signals with amplitude modulation and in addition, for NTSC and PAL. The switches designated with "A" are actuated during operation with amplitude modulation from the position illustrated.

F: operation of the circuit for signals with frequency modulation and also SECAM. The "F" designated switches are actuated in the case of operation with frequency modulation from the position illustrated.

N: operation for a NTSC signal. The "N" designated switches are actuated during NTSC operation from the position illustrated.

N': operation for NTSC with a chrominance carrier frequency of 3.58 megahertz. The "N'" designated switches are actuated in case of NTSC at 3.58 megahertz from the postion illustrated.

BG: Burst gate. Scanning of the chrominance synchronizing signal. At the locations designated with "BG" a switching through of the signal path occurs only for the duration of the chrominance synchronizing signal. The switches designated with "BG" are actuated only during the duration of the color synchronizing signal.

LP (line pulse): a line frequency pulse which is obtained from the Sandcastle pulse.

FP (frame pulse): a vertical frequency pulse at 50 Hertz, which is obtained from the Sandcastle pulse.

H/2*: half line frequency switching voltage with proper switching phase for the PAL and SECAM switch.

In the following the different modes of operation for NTSC, PAL and SECAM are illustrated and the individual internal automatic control in synchronizing functions are described successively.

NTSC OPERATION

The switch N' is closed such that the band pass filter 4 is switched between the input terminals B and C by switching on capacitor 5 to a lower chrominance carrier frequency of 3.58 megahertz. The NTSC chrominance carrier F passes from the terminal B via the stage 60 serving for the automatic control of the chrominance signal amplification (AGC) and the adjustable control phase shifter 6 to the adding stage 7 and the subtracting stage 8. The simultaneously activated switch N1 switches the amplifier 39 off such that the upper inputs of the stages 7, 8 do not receive a signal. The chrominance carrier F also appears unchanged at the two inputs of the synchronous demodulators 9, 10. The synchronous demodulator 9 is fed by the reference carrier oscillator VSO3 with a reference carrier of a certain constant phase of zero degrees, and it supplies the color difference signal (B−Y) via the switch 11 (whole line connections) and the switched off de-emphasis stage 12 at the terminal Q. The synchronous demodulator 10 receives from the oscillator VCO3 a reference carrier with a constant phase of +90 degrees and delivers the color difference signal (R−Y) via the switch 11 and the turned on de-emphasis stage 13 at the terminal P. The switch N2 is opened. The half line frequency switching voltage H/2* thereby does not pass on to the synchronous demodulator 10 such that the phase switching of the reference carrier between +90 degrees and −90 degrees indicated there and required only during PAL operation does not occur. The chrominance synchronizing signal of the output of the adding stage 7 and of the output voltage of the reference carrier VCO3 are compared in the phase comparator stage 14 which is controlled effectively with a gating pulse BG only during the time period of the color synchronizing signal. The automatic control voltage obtained this way regulates the reference carrier oscillator VCO3 via closed switch 15 and the adding stage 16 such that these oscillate with the color carrier frequency of 3.58 megahertz. The further synchronization with the quartz oscillator 2 is described in the section: Synchronizing of the Oscillators. The line delay line 3, not required during NTSC operation, becomes ineffective by the blocking of the amplifier 39, and the upper inputs of the stages 7 and 8 do not receive a signal.

PAL Decoding

The switch N1 is open and the amplifier 39 becomes effective. The undelayed chrominance carrier of the phase shifter 6 and the chrominance carrier delayed by the line period duration pass through from the controllable amplifier 39 to the stages 7, 8 operating a PAL matrix, and they are from there split off into the two chrominance carrier frequency signals F(B−Y) and +/−F(R−Y). These are demodulated in the synchronous demodulators 9, 10 such that the color difference signals (B−Y) and (R−Y) are applied to the terminals Q and P. The half line frequency switching voltage H/2* passes via the closed switch N2 to a synchronizing demodulator 10 and there effects the required line frequency phase switching of the reference carrier between +90 degrees and −90 degrees.

PAL Amplitude Calibration

The chrominance carriers have to have the same amplitude in each case at the two inputs of the PAL matrix 7, 8 stages in order to provide a problem-free operation of the PAL matrix 7, 8. For this purpose, in general conventional circuits provide a potentiometer at the output of the delay line 3. The internal control circuit provided for the adjustment of the amplitude calibration operates as follows. The chrominance carrier frequency output signals of the stages 7, 8 are fed to the phase comparison stage 17 via the gate pulse BG effective only for the duration of the color synchronizing burst signal.

In the case of proper amplitude calibration, the chrominance synchronizing burst signal components have a phase shift of 90 degrees with respect to each other at the output U, V of the stages 7, 8 such that the phase comparison stage 17 does not produce a control voltage. In the case of an amplitude difference, this phase angle changes. It becomes larger in case in an amplitude deviation in one direction and smaller in case of an amplitude deviation in the opposite direction. Thereby the set value at the output of the phase comparison stage 17 becomes larger or smaller and automatically controls the amplification of the amplifier 39 in the sense that the chrominance synchronizing burst signal components at the inputs of the phase comparison stage 17 are shifted by 90 degrees with respect to each other. This then assures that the chrominance carrier at the inputs of the stages 7, 8 have the same amplitude. An external adjuster for the adjusting of this amplitude condition is thus no longer required.

PAL Phase Calibration

In order to achieve a problem-free operation of the PAL matrix with the stages 7, 8, the base phase, that is, the phase at a chrominance carrier with the (B−Y) axis has to coincide at the two inputs of these stages. For this purpose, the inductivity at the output of the delay line 3 is adjustable in conventional circuits. The chrominance synchronizing burst signal component at the output V of the subtracting stage 8 has alternatingly the phase +90 degrees of the axis (R−Y) and phase −90 degrees of the axis −(R−Y) from line to line alternating in case of proper phase adjustment setting. This chrominance signal synchronous component passes to the input of the synchronizing demodulator 10. The pulse BG lifts the line frequency phase switching of the (R−Y) reference carrier between +90 degrees and −90 degrees during the line fly-back time such that the color synchronizing burst signal component is constantly demodulated at the axis +90 degrees. The pulses of the same amplitude and with a polarity changing from line to line are generated in each case during the period of this color synchronizing burst signal component based on the phase switching of the color synchronizing burst signal component at the output V between +90 degrees and −90 degrees at the output of the synchronizing demodulator 10. The pulses are timed selectively, evaluated with the gate 18 which is transmittedly controlled only for the duration of the color synchronizing burst signal. Filtering of the pulses results because of the same amplitude and the alternatingly differing polarity in a regulating voltage of the value 0 at the control input of the phase shifter 6. This control voltage thus does not change a proper phase shift of the phase shifter 6. We also assumed that the angle between the color synchronizing burst signal with the set point phase of 135 degrees and the set point phase of 225 degrees changes at the inputs of the subtracting stage 8 because of defective phase error balancing. Then the pulses obtained at the output of the synchronous demodulator 10 from the chrominance synchronizing burst signal component have again from line to line a differing polarity. Depending on the direction of the phase deviation, the amplitude of the positively directed pulse becomes larger and the amplitude of the negatively directed pulse becomes smaller or vice versa. After a corresponding filtering, there is thus generated a positive or negative automatic control voltage at the control input of the phase shifter 6. This control voltage changes the phase shifting of the phase shifter 6 in the sense that the color synchronizing burst signals at the inputs of the subtraction stage 8 and thus also of the adding stage 7 again assume the proper desired set point phases of 135 degrees and 225 degrees. This assures that also the modulated chrominance carriers have the proper phase with respect to each other during the line forward run time at the inputs of the stages 7, 8.

PAL Switching Phase

As already described under the heading "PAL Phase Calibration" there are generated at the output of the synchronous demodulators 10 pulses with a polarity switching from line to line. Since these pulses are obtained from the chrominance synchronizing burst signal, they contain an information for the proper switching phase of the PAL switch described by the color synchronizing burst signal. These pulses pass to the identification circuit 19 such that at the output of this circuit 19 the switching voltage H/2* is always applied in the proper switching phase. The recited circuit for correcting the PAL switching phase is described in more detail in the French Patent Application No. 8220772. The identification circuit 19 in addition identifies a standard from the signal received in each case for switching the standard for line frequency switching of the pulse sequence from the output of the synchronous demodulator 10. This function will be described below in more detail in the section "Standard Set Switching".

SECAM Decoding

The resistor 20 is switched off with the switch at the terminal E, which is closed only in case of signals with amplitude modulation. Thereby the band-pass filter 4 is damped less and effects the equalization of the chrominance carrier by the bell-shaped transmission curve (cloche) disposed within the band width of the chrominance carrier. In case of amplitude modulation (PAL, NTSC) the bell-shaped transmission curve for equalization of the chrominance carrier is not desired. Therefore in case of these modes of operation, the band-pass filter 4 is damped with the resistor 20 such that the transmission curve of the band pass filter 4 does not decrease substantially over the band width of the modulated chrominance carrier, the undelayed SECAM chrominance carrier passes from the output of the phase shifter 6 and the SECAM chrominance carrier delayed by a line duration to the output of the amplifier 39 on to the SECAM immediate cross switch 21 actuated with line frequency. The SECAM immediate cross switch 21 is controlled by the half line frequency switching voltage H/2*, and it delivers at its two outputs separately the two line sequentially transmitted SECAM chrominance carriers with different frequencies of 4.06 megahertz and 4.250 megahertz. These chrominance carriers are fed to two separate FM demodulators. These FM demodulators are formed as phase-locked loop PLL-FM demodulators, and they comprise the two oscillators VCO1 and VCO2. The frequency of the oscillator VCO2 is always automatically adjusted to the frequency of the fed-in modulated chrominance carrier via the phase-locked loop PLL automatic control circuit with the phase comparison stage 22 and the adding stage 23. This means that the output voltage of the phase comparison stage 22 of the frequency of the chrominance carrier is proportional and thus represents the color difference signal (R-Y). This passes via the switch 11 (dashed connection line) and the de-emphasis stage 13 switched on via F to the terminal connection P. The phase comparison stage 24, the adding stage 25 and the oscillator VCO1 for the color difference signal (B−Y) operate correspondingly. The color difference signal passes via the switch 11 and turned on deemphasis stage 12 to the terminal connection Q. An additional synchronizing of the oscillators VCO1 and VCO2 by quartz oscillator 2 is described in the section "Synchronizing of the Oscillators". The phase comparison stages 22, 24 are ineffectively controlled by the vertical frequency pulse $\overline{FP}$. This time is employed in order to balance the digital to analog converters 42, 43 connected at the outputs of the register 40, 41.

Amplitude Control In Case Of SECAM

The amplitude calibration described for the PAL operation with the amplifier 39 is also effective in case of SECAM operations. The SECAM chrominance carrier passes in case of SECAM operation also the PAL matrix 7,8. This matrix 7,8 is not employed for the chrominance signal generation in principal. An automatic control voltage is also generated at the control input of the amplifier 39 by multiplication of the SECAM chrominance carrier in the phase comparison stage 17 which is effectively only connected during the duration of the chrominance synchronizing burst signal. The automatic control voltage controls the amplification of the amplifier 39 in the sense that the SECAM-chrominance carrier at the output of the phase shifter 6 and at the output of the amplifier 39, that is also at the inputs of the SECAM-switch 21, are of the same amplitude.

SECAM Switching Phase

The SECAM-chrominance carrier with frequency switched from line to line passes to the phase comparison stage 26 which together with the oscillator VCO3 and the adding stage 16 forms a phase-locked loop PLL. The frequency of the oscillator VCO3 is thereby controlled alternatingly from line to line to the two different SECAM-chrominance carrier frequencies. This automatic control is performed in the same manner as that of the oscillators VCO1 and VCO2 for the SECAM decoding. If the oscillator VCO3 at the middle value of 4.328 megahertz of these two different chrominance carrier frequencies is balanced, then the automatic control voltage at the output of the phase comparison stage 26 has a polarity differing from line to line. The automatic control voltage is evaluated during these chrominance carrier oscillations with the switch 27, which is closed by the BG for the duration of the unmodulated SECAM-chrominance carrier oscillations at the start of each line. A voltage with from line to line differing polarity is obtained also thereby at the input of the identification circuit 19. The voltage with from line to line differing polarity is to be set equal to the pulse sequence resulting from the synchronization demodulator 10 in case of PAL-operation. The two lower right inputs of the identification circuit 19 thus obtain in case of PAL-operation and in case of SECAM-operation for practical purposes the same pulse sequence. In case of SECAM-operation thus again the right switching voltage H/2* for the switch 21 is assured with the pulse sequence from the output of the phase comparison stage 26 in the identification circuit 19.

Synchronising of the Oscillators

The voltage delivered by the quartz oscillator 2 with the constant frequency of 62.5 kilohertz is fed by the terminal H to the circuit 28 which contains a counter and a pulse generator. The stage 28 generates a test pulse 29 with a defined duration of from about 850 microseconds to 1 millisecond, by counting the periods of the reference frequency voltage. This test pulse 29 serves in the digital automatic frequency control circuit 30 as a time window. During this time a counting of the periods of the fed in oscillations is performed in the circuit 30 and thus a frequency determination is achieved. The reference carrier from the oscillator VCO3 passes to the input of the automatic control circuit 30 in the position b of the switch 31 provided with four inputs a, b, c, d. The frequency of the reference carrier is measured in the automatic control circuit 30 and is compared with the set point value also obtained from the reference frequency voltage. In case of deviation, a digital signal passes to the register 32. An analog automatic control voltage is obtained from its output voltage in the digital to analog converter 33, which automatic control voltage is added to the automatic control voltage from the phase comparison stage 14 in the adding stage 16. In each case after measurement time the frequency of the oscillator VCO3 is changed for such time until it assumes the set point value based on the analogous automatic control voltage. The oscillator VCO3 is also balanced by the automatic frequency control circuit 30 and additionally by the color synchronizing burst signal via analogous automatic control voltages to the proper frequency. This is required for the following reasons: An accurate frequency and phase control of the oscillator VCO3 is not possible based on the chrominance synchronizing burst signal alone. The chrominance synchronizing burst signal does not only contain the singular PAL color carrier frequency of 4.43361875 MHz, by spectral lines in each case at a distance of half the line frequency. Thus the oscillator can also lock at a spectral line which deviates by an integral multiple of the line frequency from the proper frequency. In this case, a problem free synchronous demodulation would no longer be possible. In the case of the known application of a Quartz crystal, this is not possible, since the oscillator cannot lock because of the extremely small band width of a Quartz of about 100 to 200 Hz to one of the side spectral sides. In order now to synchronize the oscillator VCO3 to the proper frequency, the additional balancing and calibration with the digital automatic frequency control circuit 30 is performed, which in turn is controlled by the Quartz stabilized voltage at the terminal H.

In the same manner the oscillators VCO1 and VCO2 are controlled to the proper frequency via the register 40, 41 and the digital to analog converter 42, 43. The analog control voltage of the digital to analog converter also represents the proper rest frequency of the oscillators VCO1 and VCO2, that is, the rest frequency of the modulated SECAM-chrominance carrier and the analog automatic control voltage of the outputs of the phase comparison stages 22, 24 changes this frequency according to the frequency modulation of the SECAM-chrominance carrier.

The oscillators VCO1, VCO2 and VCO3 are thus balanced and calibrated in case of the individual operational modes to the following frequencies.

SECAM-OPERATION:
  VCO1 with 4.250 MHz for the transmission of the signals (B−Y)
  VCO2 with 4.406 MHz for the transmission of the signals (R−Y)
  VCO3 to the center frequency (4.250°4.406)/2=4.328 MHz.
PAL-OPERATION
  VCO3 with 4.433 MHz
NTSC-OPERATION N4:
  VCO3 with 4.433 MHz
NTSC-Operation N3:
  VCO3 with 3.58 MHz The measurement of the frequencies of the oscillators VCO1 and VCO2 and VCO3 is performed with a switch 31 sequentially from field to field in each case during the vertical field blanking interval.

The switch 31 is also switched on by the pulse FP at the beginning of each field. In the position b the frequency becomes the frequency of the oscillator VCO3, in the position c, the frequency of the oscillator VCO2 and in the position d, the frequency of the oscillator VCO1 measured in the digital automatic frequency control circuit 30, and the deviation versus the set point value is transformed into a digital set point value for the registers.

Band Pass Filter Tuning

The band pass filter 4 is tuned at the terminals B,C in each case to the frequency of the chrominance carrier. This tuning has to be followed precisely in particular in case of a SECAM chrominance carrier, since the formed transmission curve for the effects the de-emphasis for the modulated SECAM-chrominance carrier. The internal oscillator 34 is thus coupled to the band pass filter 4 such that its oscillating frequency depends on the resonance frequency of the band pass filter 4. The output voltage of the oscillator 34 passes via the switch 31 in its position "a" for the duration of a field also to the digital automatic frequency control circuit 30 and is evaluated there. In case of a deviation of the resonance frequency the oscillation frequency of the oscillator 34 changes. A digital signal corresponding to the deviation is produced in the digital automatic control circuit 30 and is fed to the register 35. Depending on the deviation, the register 35 switches additional capacitors between the terminals B and C on and off such that the resonance frequency of the band pass filter 4 is adjusted to its proper value.

The switch 31 also operates in case of NTSC, PAL and SECAM in different ways. In case of NTSC-operation it assumes only the positions a and b, since the SECAM-demodulators are not required. In case of PAL-operation the same holds true. In case of SECAM-operation the switch 31 sequentialy assumes all positions a, b, c, d, since then all four oscillators 34, VCO1, VCO2 and VCO3 become effective.

The registers 35, 32, 41, 40 are switched in parallel with their inputs and are controlled sequentially by the automatic control circuit 30 with digital signals via a measurement cycle fixed by the switch 31. For this purpose, the registers 35, 32, 41, 40 are operated effectively from field to field in time sequence in each case for the duration of a vertical field blanking interval of the automatic control circuit via the control lines C1, C2, C3, C4. For example if the automatic control circuit 30 provides the digital signal for the frequency control of the oscillator VCO3, than only the register 32 is activated via the line C2, while the registers 35, 41, 40 are controlled ineffectively via the lines C1, C3, C4.

Color Tint Setting with NTSC

In the case of NTSC-operation a phase control of the chrominance carrier with a phase shifter 6 is not required since the stages 7, 8 comprise only one chrominance carrier and the adjustment of phase relation between two fed in chrominance carriers is thus not necessary. The phase shifter 6 is employed in case of NTSC-operation for the manual adjustment of the color tint. For this purpose and externally manually adjustable control voltage passes from the connection terminal Z to the phase shifter 6, and this allows adjustment of a phase shift. The phase shifter 6 is controlled by the fed in Voltages N and BG such that the change in the phase shift occurs only during the period of the color synchronizing burst signal, and the phase of the modulated chrominance carrier remains unchanged during the line forward run time. In case of the change of the phase shift of the phase shifter 6 during the line fly back time the phase of the color synchronizing signal is changed at the input of the phase comparison stage 14 and thus the phase of the reference carrier generated in the oscillator VCO3. Since then the synchronous demodulation is performed with respect to a different demodulation axis, the color tint changes in the desired way in the reproduced picture. It is also possible in case of color tint adjustment to leave the phase of the color synchronizing burst signal unchanged and to change the phase of the modulated chrominance carrier during the line forward run time. The first recited solution with the change of the phase of the chrominance synchronizing burst signal however is associated with the advantage, that the phase shift is required only for the color synchronizing burst signal and not for the modulated chrominance carrier during the line forward run time. This is advantageous because disturbances during the change of the phase shift can have effects immediately on the modulated chrominance carrier. However, they are supressed in the automatic control path of the oscillator VCO3 because of the large time constant.

Finder circuit 44 is provided for the switching from standard to standard. The finder circuit 44 is actuated by the FP-pulse and switches successively in each case for the duration of about 6 to 8 complete pictures via the outputs A, N, N' and F the complete circuit to the individual operational modes, that is amplitude modulation for NTSC and PAL (A), NTSC with 4.43 Mhz (N), NTSC with 3.58 MHz (N') and SECAM (F) with the switches shown. At the same time the finder circuit 44 scans the outputs of the identification circuit 19, if a signal with the standard of the mode of the operation adjusted in each case is received. As soon as the identification circuit 19 indicates the presence of a signal of the mode of operation adjusted in each case, than the finder circuit 44 is stopped and locks in this position such that now the signal of the standard in each case can be received. It may be assumed that an NTSC-signal with 3,58 MHz is applied to the input terminal B, that the finder circuit 44 is initially in the position A and scans the output P of the identification circuit 19. Since no PAL signal is received the identification signal 19 provides at the output P the logical value "0". The search finder circuit 44 thus switches into the mode of operation N=NTSC with 4.43 MHz and scans the output N4 of the identification circuit 19. Since this signal also is not received, the voltage value "0" present at the output N4 and the search finder circuit 44 switches into the mode of operation N' and scans the output N3 of the identification circuit 19. Here in addition the switch N' is closed. In order to tune the band pass filter 4 with the capacitor 5 to a frequency of 3.58 MHz.

The identification circuit 19 now adjusts a signal of the set mode of operation that is the NTSC-signal with 3.58 MHz and supplies the logical voltage value "1" to the output N3. The search finder circuit 44 now recognizes, that the set mode of operation will receive a signal of the coordinated standard and locks in this position. The received NTSC-signal with 3.58 MHz can now be processed by the integrated circuit 1. If no recognizable signal at all is received by the circuit 1 than the search finder circuit 44 cyclically continuously runs and scans until again a signal recognizable by the circuit 1 is found.

The mode of operation of the automatic frequency control of the oscillator VCO as well as the oscillator 34 is described in more detail based on FIG. 2. Here the components, which already are contained and illustrated in FIG. 1 are designated with the same reference numerals. The frequency f1 generated by the oscillator VCO1 is measured during a defined reference time. For this purpose the test pulse 29 is generated from the reference frequency fo of 62.5 kHz with the aid of a counter 28, and the test pulse 29 controls the open transmission of the gate 46. The frequency f1 generated by the oscillator VCO1 is applied to the input of the digital comparator 47 by the cyclically actuated switch 31. The digital comparator 47 operates alternatingly as a shift register and as a comparing counter via a control signal at the "MODE"-input of the comparator 47. The comparing counter compares the read in values from the gate 46 with value provided by a set point generator 48. The shift pulses 49 serve for the reading in and reading out of comparator 47. In case of frequency control in general, initially a deviation between the actual value and the set point value is determined as a difference for control purposes. The voltage corresponding to this difference is added in the adding stage 50 to the value determined in the preceding measurement and stored in register 40, which passes from the register 40 via the cyclically circulating switch 51 to the adding stage 50.

It is assumed that initially this has the value "0". The output of the adding stage 50 passes to the register 40 which is cycled by the cyclical switch 52. An analog automatic control voltage is formed from the digital value standing in the register 40 with the aid of the digital to analog converter 42 and the automatic control voltage is employed for controlling the frequency of the oscillator VCO1. Thereby a new output frequency f1 is obtained, which again passes into the digital comparator 47 and is compared there with the set point from the set point generator 48. A new smaller difference value is obtained, which is added to the value obtained in the preceding measurement and stored in the register 40, added in the adding stage 50 and which is again entered into the register 40. Then a new automatic control voltage for the oscillator VCO1 is gained via the digital to analog converter 42. These operations repeat until the difference value becomes "0". When nothing is any longer added in the adding stage 50 and the value in the register 40 as well as the analog control voltage provided by the digital to analog converter 42 assume now a stable value, where the frequency f1 exhibits its set point. If the the comparator 47 determines the difference value "0", that is, if all outputs of the comparator 47 assume the state "0", then the switch 54 is open via the detector 53, such that no further shift pulses 49 can pass to the register 40.

The described process can also be applied for the generation of several stable frequencies f1 to f4 for as many oscillators as desired, such as is indicated by the additionally illustrated oscillators VCO2, VCO3, 34 and the register 35. The resonance frequency of the band pass filter 4 and thus the frequency of the oscillator 34 are controlled in the manner described based on FIG. 1 by the register 35 by switching on and switching off of capacitors based on incoming digital signals.

Figure 3:
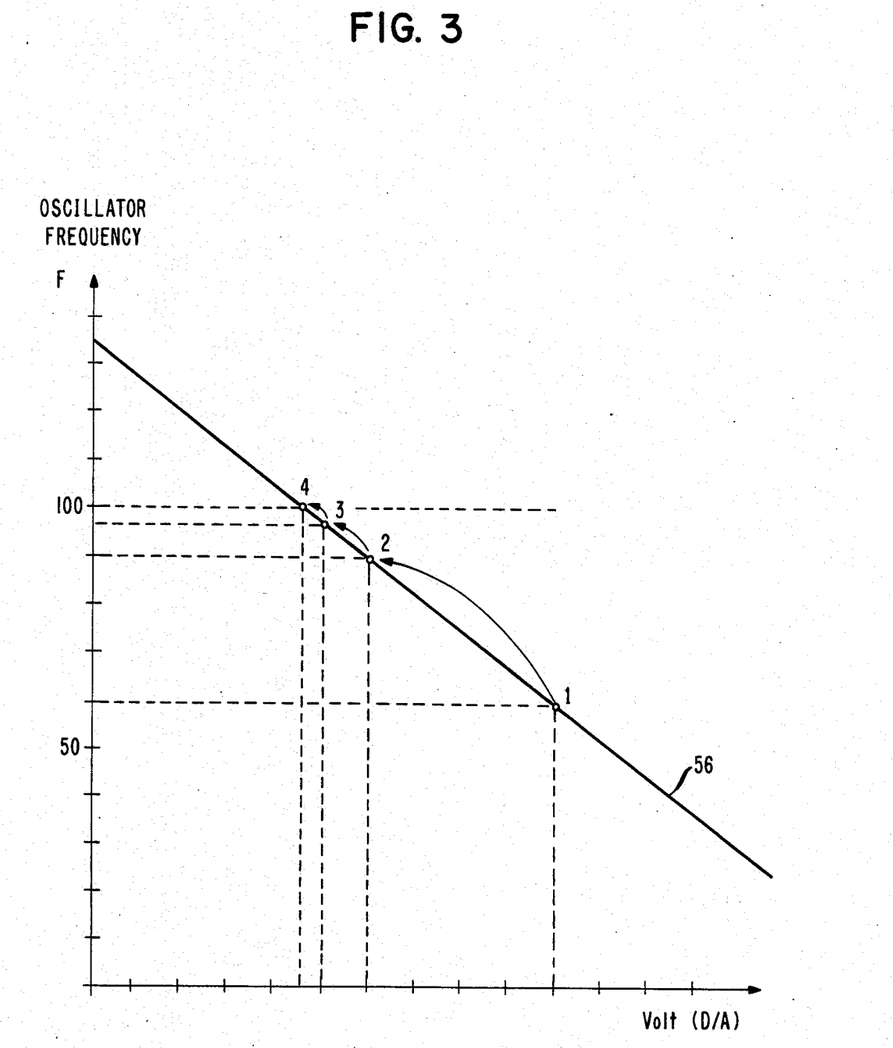
FIG. 3 is a curve diagram illustrating the operation of the automatic control circuit of FIG. 2.

The course of the control process is represented in FIG. 3 based on the diagram. The diagram illustrates the function of the measured oscillator frequency f depending on the value present in the register and thus depending on the controlling automatic control voltage. The set point value of the frequency f is entered with "100" on the ordinate. The function is represented by the curve 56. It is to be assumed that the voltage value generated by the digital to analog converter sets the oscillator to a frequency which generates the measurement value "60", which deviates from the set point "100" by the value −40. The value of the register is descreased based on the adding stage 50 by this deviation. A new frequency value of "90" results from the functioning. The new difference is now −10. Thereupon, after a repeated automatic control process, the value "99" is obtained. It can be recognized that the oscillator frequency f approaches continuously and in steps to the set point. The individually adjusted points are represented by the FIGS. 1, 2, 3, 4, where the FIG. 1 represents the output value of the frequency f and the FIG. 4 represents the final set point of the frequency f.

The simultaneous application of the described automatic control circuits contained in the integrated circuit 1 is particularly advantageous in an integrated circuit, since the number of components within an integrated circuit does not influence the cost of the circuit in an appreciable amount. The described circuits however can also be applied individually by themselves in a conventional switching technique for the solution of the purposes and objects described.

It will be understood that each of the elements described above, or two or more together, may also find a useful application in other types of recording system configurations and radiation signal processing procedures differing from the types described above.

While the invention has been illustrated and described as embodied in the context of an integrated circuit for the color decoder of a television set, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An integrated circuit for chrominance decoding in a television receiver comprising
   an adding stage for adding chrominance carrier signals of two time sequentially following lines;
   a subtraction stage for subtracting chrominance carrier signals of two time sequentially following lines, where the adding stage and the subtraction stage require the presence of external adjustment components for synchronization, balancing and/or calibration of their input signals;
   oscillators providing a demodulation of the chrominance carrier signals;
   the improvement comprising
   an automatic control circuit for substituting said external adjustment components for synchronization, balancing and/or calibration by automatic adjustment components internal to the automatic control circuit for automatically adjusting the desired operational condition to a optimal value of providing equal amplitude and a defined phase relationship to the chrominance carrier signals at the input of said adding stage and at the input said subtracting stage;
   an internal digital frequency control circuit;
   a terminal for the application of an external reference voltage in order to provide synchronizing functions via said internal digital automatic frequency control circuit;
   internal oscillators synchronized by the internal automatic frequency control circuit and generating a reference carrier for the decoding of a chrominance carrier F;
   a PAL and/or NTSC reference carrier oscillator; and
   a phase locked loop circuit such that the PAL and/or NTSC reference carrier oscillator becomes synchronized by a color synchronization burst signal via the phase locked loop.

2. The integrated circuit for chrominance decoding in a television receiver according to claim 1 further comprising
   phase comparison stage of color synchronizing burst components at the outputs of the adding stage and of the subtraction stage for obtaining a regulating voltage for automatically controlling of the amplification of the delayed or undelayed chrominance carrier signals F.

3. The integrated circuit for chrominance decoding in a television receiver according to claim 1 further comprising
   a phase comparison stage provided for amplitude calibration during SECAM operation where SECAM color carriers of time sequential lines are applied to inputs of the phase comparison stage and an output voltage of the phase comparison stage is employed for regulating the amplification of undelayed or delayed SECAM chrominance carrier during the duration of unmodulated SECAM-chrominance carrier vibrations at the start of each line.

4. The integrated circuit for chrominance decoding in a television receiver according to claim 1 further comprising
   a phase shifter for evaluation of the phase of a color synchronizing burst component at an output of the adding stage or of the subtraction stage relative to a fixed modulation axis for achieving phase calibration via obtaining a regulating voltage for automatically controlling the phase rotation of the phase shifter disposed in the path of an undelayed or of a delayed chrominance carrier wherein a color tint is adjusted only during the duration of the color synchronizing burst and only during the horizontal line forward run time by a change of the phase shift of the phase shifter and wherein the phase shifter is employed for a manual adjustment of the color tint during NTSC operation;
   a connection terminal of the circuit having an externally adjustable voltage; and
   a control terminal associated with the phase shifter having applied said externally adjustable voltage.

5. The integrated circuit for chrominance decoding in a television receiver according to claim 4 further comprising
   a band-pass filter including an oscillating circuit and disposed in the path of the chrominance carrier.

6. The integrated circuit for chrominance decoding in a television according to claim 1 further comprising
   a test pulse generator for generating a test pulse of defined duration and where the frequency determination of frequencies to be controlled is provided by counting the number of periods of the voltage signal to be measured in each case in the digital automatic frequency control circuit;

a digital comparator fed with the voltage obtained by the frequency determination and with a frequency set point, which comparator operates alternatingly as a shift register and as a comparing counter based on a control signal applied at a "MODE"-input of the comparator;

a register;

an adding stage for adding the voltage obtained by a preceding measurement and stored in the register to the difference voltage obtained in the comparator by comparing the actual value with the set point value and where the sum signal is employed for frequency control of a local oscillator.

7. The integrated circuit for chrominance decoding in a television receiver according to claim 6 further comprising a digital comparator fed with the voltage obtained by the frequency determination and with a frequency set point, which comparator operates alternatingly as a shift register and as a comparing counter.

8. The integrated circuit for chrominance decoding in a television receiver according to claim 7 further comprising a register;

an adding stage for adding the voltage obtained by a previous measurement and stored in the register to the difference voltage obtained in the comparator by comparing the actual value with the set point value and where the sum signal is employed for frequency control.

9. The integrated circuit for chrominance decoding in a television receiver according to claim 1 further comprising a switch;

several oscillators, where the measurement of the frequencies of the oscillators is performed cyclically and successively by switching an input of the digital automatic frequency control circuit with said switch positioned between the outputs of the oscillators and said digital automatic frequency control circuit.

10. The integrated circuit for chrominance decoding in a television receiver according to claim 1 further comprising separate registers fed cyclically and successively with the output of the digital automatic frequency control circuit for individual control functions; and an analog to digital converter fed with regulating voltages coming from the outputs of the registers for generation of synchronizing functions;

wherein an output of the digital automatic frequency control circuit is connected in parallel to the inputs of the registers and where the registers are activated according to a cyclical succession.

11. The integrated circuit for chrominance decoding in a television receiver according to claim 10 further comprising separate registers fed cyclically and successively with the output of the digital automatic frequency control circuit for individual control functions; and an analog to digital converter fed with regulating voltages coming from the outputs of the registers for generation of synchronizing functions;

wherein a cyclical switching is provided from field to field and where a measurement or, respectively, activation is performed during the vertical field blanking interval.

12. The integrated circuit for chrominance decoding in a television receiver according to claim 1 further comprising an external oscillating circuit;

internal reactances disposed in the integrated circuit;

an internal oscillator which has an output connected to an input of the automatic frequency control circuit such that the frequency of the internal oscillator depends on the resonance frequency of the external oscillating circuit and where a set value is obtained by measuring of the oscillator frequency, which set value induces switching of internal reactances to the oscillating circuit such that the oscillating circuit runs at the set point frequency; and a band-pass filter including an oscillating circuit and disposed in the path of the chrominance carrier.

13. An integrated circuit for chrominance decoding in a television receiver comprising an adding stage for adding chrominance carrier signals of two time sequentially following lines;

subtraction stage for subtracting chrominance carrier signals of two time sequentially following lines, where the adding stage and the subtraction stage require the presence of external adjustment components for synchronization, balancing and/or calibration of their input signals;

oscillators providing a demodulation of the chrominance carrier signals;

the improvement comprising an automatic control circuit for substituting said external adjustment components for synchronization, balancing and/or calibration by automatic adjustment components internal to the automatic control circuit for automatically adjusting the desired operational condition to an optimal value of providing equal amplitude and a defined phase relationship to the chrominance carrier signals at the input of said adding stage and at the input said subtracting stage;

switches for directing the processing of signals of different color television standards (NTSC, PAL, SECAM) disposed within the integrated circuit;

an internal switch;

an externally connected equalization filter for the chrominance carrier and effective during SECAM operation, wherein said internal switch connects in parallel a damping resistor during NTSC and PAL operation;

a second internal switch;

an external band pass filter for the chrominance carrier connected to the second internal switch for switching on or off an external capacitor for tuning to the chrominance carrier frequency in each case of tuning;

a third internal switch, which turns off the path of a delayed chrominance carrier to the adding stage and to the subtraction stage of the PAL matrix during NTSC mode operation;

internal de-emphasis stages, which are disposed in the path of the color difference signals ((R-Y), (B-Y)) and which are switched on during SECAM operation; and two phase locked loop PLL-FM demodulators fed with two frequency modulated line sequentially transmitted chrominance carriers of differing frequency during SECAM mode operation.

14. The integrated circuit for chrominance decoding in a television receiver according to claim 13 further comprising
- a phase locked loop including a PAL reference carrier oscillator and a phase comparison stage fed with a received modulated SECAM chrominance carrier during SECAM mode operation and where the modulated SECAM chrominance carrier is employed for the sychronizing of the SECAM switching with line frequency during the time of the color synchronizing burst signal by using the output voltage of phase locked loop occurring with a polarity differing from line to line;
- a control circuit for automatically effecting a cyclical switching to the operational modes of any incoming signals at the individual standards such as NTSC, PAL, SECAM and which locks in this position upon recognition of an identification signal associated with such standard;
- a search finder circuit effecting the cyclical switching to the operational modes;
- an identification circuit scanning various operational modes for the presence of a signal of the standard of the operational mode at a respective point of the scanning in each case and which stops in the presence of such a signal.

15. A method for decoding a chrominance signal in a television receiver set employing an integrated circuit including the steps of
- frequency tuning of oscillators providing cyclic signals with a digital automatic frequency control circuit connected to said oscillators;
- demodulating a chrominance carrier with an oscillator signal;
- balancing the amplitude and the phase of a chrominance carrier corresponding to a sequential line;
- adding a chrominance carrier to two time sequential lines in an adding stage having an output;
- subtracting a chrominance carrier of the time sequential lines in a subtraction stage having an output;
- controlling the amplitude by the added or subtracted signal with phase control by either the added or the subtracted signal;
- feeding color synchronization signals from the output of the adding stage and from the output of the subtraction stage to automatic control circuits;
- evaluating the color synchronization signals in the automatic control circuits;
- automatically controlling synchronizing and calibration components of the television receiver set with the automatic control circuits of the integrated circuit for obtaining automatically the television system operational mode desired in each case; and
- applying a reference voltage coming from an external voltage source to a connector terminal connected to the automatic frequency control circuit.

16. The method for decoding a chrominance signal in a television receiver set employing as integrated circuit according to claim 15 including the additional steps of
- comparing the phase of color synchronizing burst signal components for the amplitude calibration of a PAL delay time decoder; and
- obtaining at the outputs of an adding stage and of a subtracting stage of a PAL matrix a control voltage for automatically adjusting the amplification of a delayed or undelayed chrominance carrier.

17. The method for decoding a chrominance signal in a television receiver set employing an integrated circuit according to claim 15 further including the additional steps of
- applying the lines following in a time sequence at the inputs of a phase comparison stage to an amplitude calibrator during SECAM operation;
- automatically controlling the amplification of an undelayed or of a delayed SECAM chrominance carrier during duration of the unmodulated SECAM chrominance carrier oscillations at the start of each line.

18. The method for decoding a chrominance signal in a television receiver set employing an integrated circuit according to claim 15 including the additional steps of
- evaluating the phase of a color synchronizing burst signal component present at the output of an adding stage or of a subtraction stage of a PAL matrix relative to a fixed modulation axis; and
- obtaining a voltage for automatic control of a phase shift of a phase shifter disposed in the path of an undelayed or of a delayed chrominance carrier.

19. The method for decoding a chrominance signal in a television receiver set employing an integrated circuit according to claim 15 including the additional steps of
- generating a test pulse of defined duration from the reference frequency voltage; and
- counting the number of periods of the voltage signal to be measured in each case during the duration of the test pulse in the automatic frequency control circuits.

20. The method for decoding a chrominance signal in a television receiver set employing an integrated circuit according to claim 15 including the additional steps of
- switching the integrated circuit internally for directing to the processing of signals according to a respective different color television standards such as NTSC, PAL, SECAM.

21. An integrated circuit for chrominance decoding in a television reciever comprising
- an adding stage for adding a chrominance carrier of two time sequential lines and having an output;
- a subtraction stage for subtracting a chrominance carrier of two time sequential lines and having an output;
- automatic control circuits for evaluating color synchronization signals coming from the output of the adding stage and from the output of the subtraction stage where the automatic control circuits include amplitude balancing of the chrominance carrier fed to the addition stage and to the subtraction stage;
- phase balancing means connected to the subtraction stage or to the adding stage;
- an oscillator demodulator for the chrominance carrier;
- a digital automatic frequency control circuit connected to the oscillator demodulator for frequency tuning of the oscillator demodulator; and
- a connector terminal connected to the automatic frequency control circuit for application of a reference frequency coming from an external voltage source;
- a phase shifter forming part of the control circuits where a phase balancing is achieved by evaluation of the phase of a color synchronizing burst component at an output of the adding stage or of the subtraction stage relative to a fixed modulation axis in the control circuit via obtaining a regulating voltage for automatically controlling the phase rotation of said phase shifter disposed in the path of an undelayed or of a delayed chrominance carrier.

22. The integrated circuit for chrominance decoding in a television receiver according to claim 21 further comprising phase comparison stage forming part of the automatic control circuits adapted for PAL-operation and receiving chrominance synchronization signals from the output of the adding stage and from the output of the subtraction stage and having an output, where the output voltage of the phase comparison stage is employed as a control voltage for controlling amplification in the control circuits of an undelayed or delayed chrominance carrier signal, for obtaining a regulating voltage for automatically controlling of the amplification of the delayed or undelayed chrominance carrier.

23. The integrated circuit for chrominance decoding in a television receiver according to claim 22 further comprising a phase comparison stage forming part of the automatic control circuits provided for amplitude calibration during SECAM operation where SECAM color carriers of time sequential lines are applied to inputs of the phase comparison stage and an output voltage of the phase comparison stage is employed for regulating the amplification of undelayed or delayed SECAM chrominance carrier during the duration of unmodulated SECAM-chrominance carrier vibrations at the start of each line.

24. The integrated circuit for chrominance decoding in a television receiver according to claim 21 wherein the phase shifter is employed for a manual adjustment of the color tint during NTSC operation.

25. The integrated circuit for chrominance decoding in a television receiver according to claim 24 further comprising a connection terminal of the circuit having an externally adjustable voltage; and
a control terminal associated with the phase shifter having applied said externally adjustable voltage.

26. The integrated circuit for chrominance decoding in a television receiver according to claim 24 wherein a color tint is adjusted only during the duration of the color synchronizing burst and only during the horizontal line forward run time by a change of the phase shift of the phase shifter.

27. The integrated circuit for chrominance decoding in a television receiver according to claim 21 further comprising a PAL and/or NTSC reference carrier oscillator; and
a phase locked loop circuit such that the PAL and/or NTSC reference carrier oscillator becomes synchronized by a color synchronization burst signal via the phase locked loop.

28. The integrated circuit for chrominance decoding in a television receiver according to claim 21 further comprising a test pulse generator for generating a test pulse of defined duration and where the frequency determination of frequencies to be controlled is provided by counting the number of periods of the voltage signal to be measured in each case in the digital automatic frequency control circuit.

29. The integrated circuit for chrominance decoding in a television receiver according to claim 28 further comprising a digital comparator fed with the voltage obtained by the frequency determination and with a frequency set point, which comparator operates alternatingly as a shift register and as a comparing counter based on a control signal applied at a "MODE"-input of the comparator.

30. The integrated circuit for chrominance decoding in a television reciever according to claim 29 further comprising a register;
an adding stage for adding the voltage obtained by a preceding measurement and stored in the register to the difference voltage obtained in the comparator by comparing the actual value with the set point value and where the sum signal is employed for frequency control of a local oscillator.

31. The integrated circuit for chrominance decoding in a television receiver according to claim 21 further comprising a switch;
several oscillators, where the measurement of the frequencies of the oscillators is performed cyclically and successively by switching an input of the digital automatic frequency control circuit with said switch positioned between the outputs of the oscillators and said digital automatic control circuit.

32. The integrated circuit for chrominance decoding in a television receiver according to claim 31 wherein a cyclical switching is provided from field to field and where a measurement or, respectively, activation is performed during the vertical field blanking interval.

33. The integrated circuit for chrominance decoding in a television receiver according to claim 21 further comprising separate registers fed cyclically and successively with the output of the digital automatic frequency control circuit for individual control functions; and
an analog to digital converter fed with regulating voltages coming from the outputs of the registers for generation of synchronizing functions.

34. The integrated circuit for chrominance decoding in a television receiver according to claim 33 wherein an output of the digital automatic frequency control circuit is connected in parallel to the inputs of the registers and where the registers are activated according to a cyclical succession.

35. The integrated circuit for chrominance decoding in a television receiver according to claim 21 further comprising an external oscillating circuit;
internal reactances disposed in the integrated circuit; and an internal oscillator which has an output connected to an input of the automatic frequency control circuits such that the frequency of the internal oscillator depends on the resonance frequency of the external oscillating circuit and where a set value is obtained by measuring of the oscillator frequency, which set value induces switching of internal reactances to the oscillating circuit such that the oscillating circuit runs at the set point frequency.

36. The integrated circuit for chrominance decoding in a television receiver according to claim 35 further comprising a band-pass filter including an oscillating circuit and disposed in the path of the chrominance carrier.

37. The integrated circuit for chrominance decoding in a television receiver according to claim 21 further comprising a phase locked loop including a PAL reference carrier oscillator and a phase comparison stage fed with a received modulated SECAM chrominance carrieer during SECAM mode operation and where the modulated SECAM chrominance carrier is employed for the synchronizing of the SECAM switching with line frequency during the time of the color synchronizing burst signal based on the output voltage of phase locked loop occurring with a polarity differing from line to line.

* * * * *